(12) United States Patent
Miyamoto et al.

(10) Patent No.: US 11,628,391 B2
(45) Date of Patent: Apr. 18, 2023

(54) CARBON DIOXIDE RECOVERY APPARATUS

(71) Applicant: Mitsubishi Heavy Industries Engineering, Ltd., Yokohama (JP)

(72) Inventors: Osamu Miyamoto, Houston, TX (US); Takashi Kamijo, Kanagawa (JP); Shinya Kishimoto, Kanagawa (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 103 days.

(21) Appl. No.: 16/849,132

(22) Filed: Apr. 15, 2020

(65) Prior Publication Data

US 2021/0322921 A1 Oct. 21, 2021

(51) Int. Cl.

| B01D 53/14 | (2006.01) |
|---|---|
| B01D 53/62 | (2006.01) |
| B01D 53/78 | (2006.01) |
| B01D 53/00 | (2006.01) |
| B01D 53/96 | (2006.01) |

(52) U.S. Cl.
CPC ....... B01D 53/1475 (2013.01); B01D 53/002 (2013.01); B01D 53/78 (2013.01); B01D 53/96 (2013.01); B01D 2257/504 (2013.01); B01D 2257/80 (2013.01); B01D 2258/0283 (2013.01)

(58) Field of Classification Search
CPC .......... B01D 2257/504; B01D 2257/80; B01D 2258/0283; B01D 53/002; B01D 53/1475; B01D 53/78; B01D 53/96;
USPC ..................... 95/236; 423/226–228
See application file for complete search history.

(56) References Cited

U.S. PATENT DOCUMENTS

| 5,378,442 A * | 1/1995 | Fujii | B01D 53/1418 423/239.1 |
|---|---|---|---|
| 6,485,547 B1 * | 11/2002 | Iijima | F23J 15/04 96/242 |
| 9,238,191 B2 | 1/2016 | Nagayasu et al. | |
| 9,314,734 B2 | 4/2016 | Baburao et al. | |

(Continued)

FOREIGN PATENT DOCUMENTS

| JP | 2016-159239 A | 9/2016 |
|---|---|---|
| JP | 2016159239 A * | 9/2016 |

(Continued)

*Primary Examiner* — Frank M Lawrence, Jr.
(74) *Attorney, Agent, or Firm* — WHDA, LLP

(57) ABSTRACT

A carbon dioxide recovery apparatus is disclosed including a flue gas cooling unit that brings flue gas cooling water into contact with a flue gas to cool the flue gas, a circulation channel through which the flue gas cooling water and condensed water are returned to the flue gas cooling unit, an absorption unit including a carbon dioxide absorbing section, and a flue gas washing section that brings the flue gas including carbon dioxide absorbed in the carbon dioxide absorbing section into contact with flue gas washing water and washes the flue gas, a regeneration unit that removes carbon dioxide from the absorbent including carbon dioxide absorbed in the absorption unit, a supply channel through which circulating water is guided, and a discharge channel through which the circulating water circulating through the flue gas cooling unit and the circulation channel is discharged to outside of a system.

7 Claims, 6 Drawing Sheets

(56) References Cited

U.S. PATENT DOCUMENTS

| | | | |
|---|---|---|---|
| 9,492,786 B2 | 11/2016 | Johnson et al. | |
| 2009/0148371 A1* | 6/2009 | Reddy | B01D 53/1456 |
| | | | 95/228 |
| 2014/0245888 A1 | 9/2014 | Tsujiuchi et al. | |
| 2014/0248206 A1* | 9/2014 | Tsujiuchi | B01D 53/1475 |
| | | | 423/437.1 |
| 2016/0151735 A1 | 6/2016 | Fischer et al. | |
| 2016/0288049 A1 | 10/2016 | Tanaka et al. | |
| 2020/0114305 A1 | 4/2020 | Miyamoto et al. | |

FOREIGN PATENT DOCUMENTS

| | | | |
|---|---|---|---|
| JP | 6071838 B2 | | 2/2017 |
| JP | 6225572 B2 | * | 11/2017 |
| JP | 6225572 B2 | | 11/2017 |
| JP | 2020-093187 A | | 6/2020 |
| WO | 2013/039041 A1 | | 3/2013 |
| WO | 2014/177295 A1 | | 11/2014 |

\* cited by examiner

CARBON DIOXIDE RECOVERY APPARATUS

TECHNICAL FIELD

The present disclosure relates to a carbon dioxide recovery apparatus.

BACKGROUND ART

There has been known a carbon dioxide recovery apparatus that recovers carbon dioxide in a flue gas generated by fuel combustion or the like. Some carbon dioxide recovery apparatus is provided with a plurality of cooling devices that cool various fluids to be distributed (e.g., a cooling device that cools the flue gas, a cooling device that cools carbon dioxide, etc.). In each cooling device, a large amount of cooling water is used to cool the fluid. Therefore, an amount of cooling water for use in the whole carbon dioxide recovery apparatus also increases. Consequently, it is discussed that the amount of the cooling water for use in the carbon dioxide recovery apparatus should be decreased (e.g., Patent Literature 1).

Patent Literature 1 describes a recovery apparatus including an absorption tower that brings a gas G containing carbon dioxide into contact with an absorbent and causes the absorbent to absorb carbon dioxide, a regeneration tower that heats the absorbent including absorbed carbon dioxide, releases carbon dioxide from the absorbent and regenerates the absorbent, and a pretreatment tower having a function of a flue gas cooling tower that preliminarily cools the gas G to be supplied to the absorption tower to adjust a temperature of the gas to a proper temperature suitable for the absorption of carbon dioxide. A circulation path through which the flue gas cooling water that cools the gas G circulates is attached to an outer side of the pretreatment tower. The flue gas cooling water in a bottom part of the pretreatment tower is refluxed upward from a gas-liquid contact part in the pretreatment tower through the circulation path. The pretreatment tower cools the gas G passing through the gas-liquid contact part with the flue gas cooling water refluxed from the circulation path. In the circulation path to circulate the flue gas cooling water, a branch path is provided to divide the flue gas cooling water. In the recovery apparatus, if condensed water is generated from the gas G by cooling in the gas-liquid contact part, the condensed water (specifically, an amount of circulating water corresponding to an amount of condensed water) is divided from the circulation path through the branch path, and the divided circulating water is finally added to the absorbent (the absorption tower).

CITATION LIST

Patent Literature

[PTL 1]
Japanese Patent No. 6225572

SUMMARY OF INVENTION

Technical Problem

In a carbon dioxide recovery apparatus, a concentration of absorbent in a system changes in accordance with an amount of water inside the system (within flow in a flue gas cooling tower, an absorption tower and a regeneration tower). Specifically, if the amount of water inside the system increases, the concentration of the absorbent decreases. On the other hand, if the amount of water inside the system decreases, the concentration of the absorbent increases. For suitably absorbing carbon dioxide in the absorption tower, it is necessary to keep the concentration of the absorbent in a predetermined range. Therefore, for suitably absorbing carbon dioxide in the absorption tower, it is necessary to keep the amount of water inside the system within a predetermined range (hereinafter, to keep the amount of water inside the system within the predetermined range will be referred to as "to keep water balance"), and to keep the concentration of the absorbent in the predetermined range.

In the apparatus described in Patent Literature 1, a total amount of condensed water generated in a flue gas introduced into a pretreatment tower is supplied to the absorption tower. That is, water to be discharged to outside of the system (outside of the flow in the flue gas cooling tower, the absorption tower, and the regeneration tower) is only water included in the flue gas discharged from the absorption tower, except for a small amount of water included in a carbon dioxide gas exiting the regeneration tower. Therefore, to keep water balance in the carbon dioxide recovery apparatus, it is necessary to set the amount of water included in the flue gas introduced into the pretreatment tower (hereinafter, referred to as "the amount of water to be introduced") to about the same amount as the amount of water included in the flue gas to be discharged from the absorption tower (hereinafter, referred to as "the amount of water to be discharged"). The amount of water to be introduced changes in accordance with a state of the apparatus from which the flue gas is discharged, or the like. Therefore, in the apparatus described in Patent Literature 1, it is necessary to change the amount of water to be discharged in accordance with the amount of water to be introduced.

For example, in a case where the amount of water to be introduced is large, the amount of water to be included in the flue gas including carbon dioxide absorbed in the absorption tower and exiting an absorption unit might be smaller than the amount of water to be introduced. In such a case, in the apparatus described in Patent Literature 1, the condensed water supplied from the pretreatment tower to the absorption tower is heated and thereby evaporated. Then, the evaporated condensed water is added to the flue gas that exits the absorption unit, to increase the amount of water to be discharged. In this way, the amount of water to be introduced is set to be about the same as the amount of water to be discharged.

However, if a structure that evaporates the condensed water is provided in the absorption tower, a structure of the whole carbon dioxide recovery apparatus might be complicated. Furthermore, the complicated structure of the whole carbon dioxide recovery apparatus might increase cost.

The present disclosure has been developed in view of such situations, and an object thereof is to provide a carbon dioxide recovery apparatus having a simple structure.

Solution to Problem

To solve the above problem, the carbon dioxide recovery apparatus of the present disclosure employs the following solutions.

A carbon dioxide recovery apparatus according to an aspect of the present disclosure includes a flue gas cooling unit that brings flue gas cooling water into contact with a flue gas to cool the flue gas, a circulation channel through which the flue gas cooling water that cools the flue gas and condensed water generated by cooling the flue gas are extracted from the flue gas cooling unit and returned to the flue gas cooling unit, an absorption unit including a carbon dioxide absorbing section that brings the flue gas cooled in the flue gas cooling unit into contact with an absorbent and causes the absorbent to absorb carbon dioxide included in the flue gas, and a flue gas washing section that brings the flue gas including carbon dioxide absorbed in the carbon dioxide absorbing section into contact with flue gas washing water and washes the flue gas, a regeneration unit that removes carbon dioxide from the absorbent including carbon dioxide absorbed in the absorption unit, a supply channel through which circulating water circulating through the flue gas cooling unit and the circulation channel is guided as the flue gas washing water to the flue gas washing section, and a discharge channel through which the circulating water circulating through the flue gas cooling unit and the circulation channel is discharged to outside of a system.

Advantageous Effects of Invention

According to the present disclosure, a carbon dioxide recovery apparatus can have a simple structure.

DESCRIPTION OF EMBODIMENTS

Hereinafter, description will be made as to an embodiment of a carbon dioxide recovery apparatus according to the present disclosure with reference to the drawings.

First Embodiment

Figure 1:
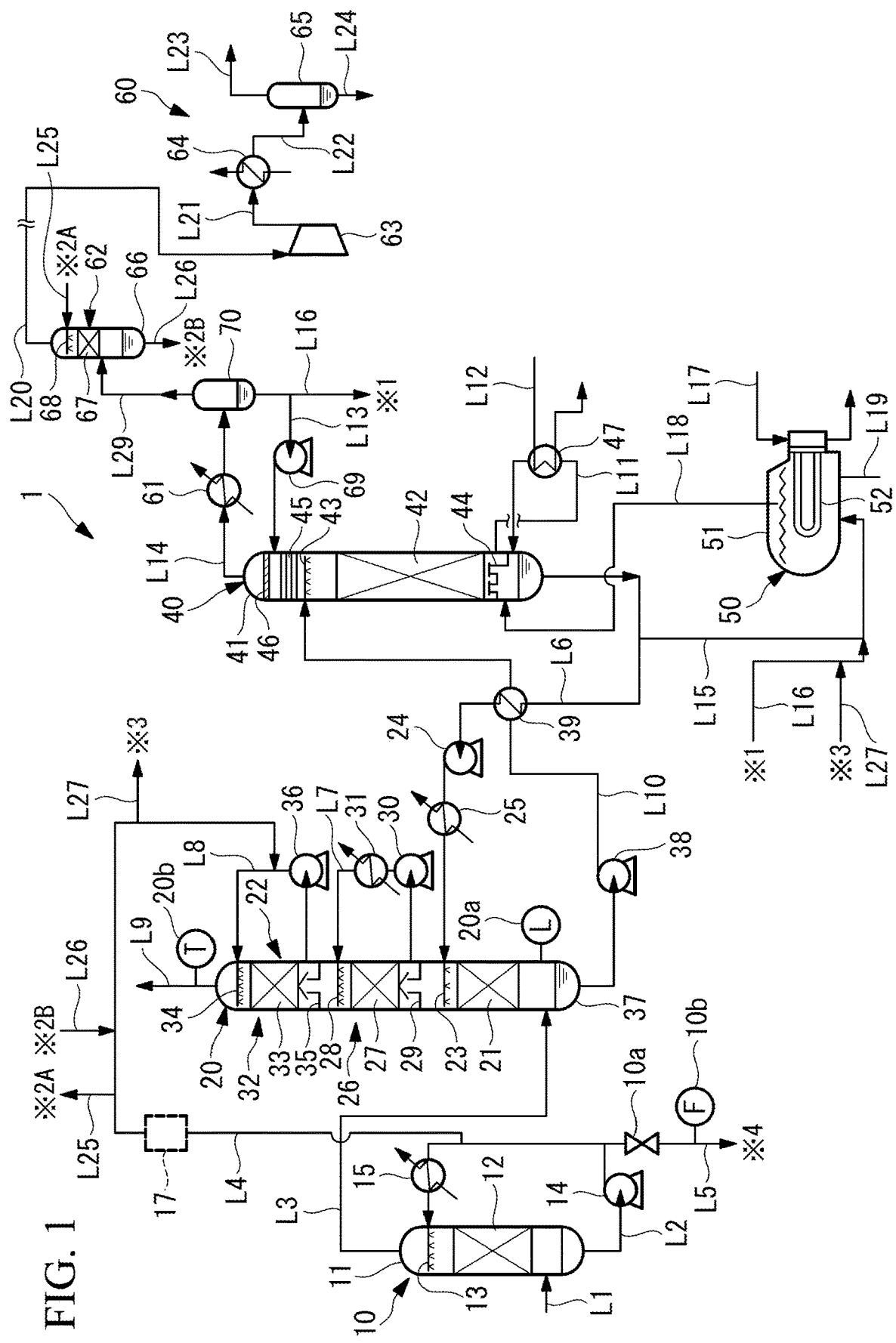
FIG. 1 is a schematic configuration diagram of a carbon dioxide recovery apparatus according to a first embodiment of the present disclosure.

Hereinafter, description will be made as to a first embodiment of the present disclosure with reference to FIG. 1.
FIG. 1 is a schematic diagram of a carbon dioxide recovery apparatus 1 according to the first embodiment of the present disclosure. The carbon dioxide recovery apparatus 1 is an apparatus to recover carbon dioxide from a flue gas containing carbon dioxide discharged from power generation equipment, a factory or the like (hereinafter, referred to as "the flue gas"). As shown in FIG. 1, the carbon dioxide recovery apparatus 1 includes a flue gas cooling tower (a flue gas cooling unit) 10 that cools a flue gas, an absorption tower (an absorption unit) 20 that causes an absorbent to absorb carbon dioxide in the flue gas cooled in the flue gas cooling tower 10, and a regeneration tower (a regeneration unit) 40 that regenerates the absorbent including carbon dioxide absorbed in the absorption tower 20. Furthermore, the carbon dioxide recovery apparatus 1 includes a reclaimer 50 that removes impurities (a deteriorated material) from the absorbent regenerated in the regeneration tower 40. Additionally, the carbon dioxide recovery apparatus 1 includes a carbon dioxide treatment unit 60 that treats carbon dioxide discharged from the regeneration tower 40.

The flue gas cooling tower 10 includes an outer shell 11, a gas-liquid contact section 12 accommodated in the outer shell 11, and a cooling water supply section 13 that supplies flue gas cooling water to the gas-liquid contact section 12 from above. A flue gas introduction line L1 is connected to a lower part of the outer shell 11. The flue gas from the factory or the like not shown is introduced into the flue gas cooling tower 10 via the flue gas introduction line L1.

The cooling water supply section 13 supplies the flue gas cooling water to the gas-liquid contact section 12 from above. In the gas-liquid contact section 12, the flue gas cooling water comes in contact with the flue gas, to cool the flue gas. The flue gas cooling water descending from the gas-liquid contact section 12 is stored in a lower part of the flue gas cooling tower 10. Furthermore, when the flue gas is cooled, water included in the flue gas condenses. The condensed water generated from the flue gas is also stored in a bottom part of the flue gas cooling tower 10. Therefore, water in which the flue gas cooling water and the condensed water are mixed is stored in the bottom part of the flue gas cooling tower 10.

The flue gas cooling tower 10 is provided with a first circulation line (a circulation channel) L2 that guides, to the cooling water supply section 13, the flue gas cooling water (including the condensed water) stored in the bottom part of the flue gas cooling tower 10. The first circulation line L2 is provided with a circulating water pump 14, and a circulating water cooling device 15 that cools circulating water. The circulating water is water circulating through the first circulation line L2, specifically the flue gas cooling water including the condensed water of the flue gas cooling tower 10. In the circulating water cooling device 15, the circulating water is thermally brought into contact with a cooling medium (e.g., water or the like) via a heat transfer tube or the like, and heat exchange is performed between the circulating water and the cooling medium to cool the circulating water. That is, in the circulating water cooling device 15, the circulating water is not directly in contact with the cooling medium. An upper part of the flue gas cooling tower 10 is connected to a lower part of the absorption tower 20 by a flue gas line L3. The flue gas line L3 guides, to the absorption tower 20, the flue gas cooled in the flue gas cooling tower 10.

Furthermore, the first circulation line L2 is connected to a supply line L4 (a supply channel) that guides the circulating water to the absorption tower 20. Additionally, the first circulation line L2 is connected to a discharge line (a discharge channel) L5 that discharges the circulating water to outside of a system. Details of the supply line L4 and the discharge line L5 will be described later.

The absorption tower 20 includes an outer shell 37, a carbon dioxide absorbing section 21 that absorbs carbon dioxide in the flue gas, and a washing section 22 provided above the carbon dioxide absorbing section 21 to wash the flue gas from which carbon dioxide is removed. The carbon dioxide absorbing section 21 and the washing section 22 are accommodated in the outer shell 37.

An absorbent supply section 23 that supplies the absorbent to the carbon dioxide absorbing section 21 is provided above the carbon dioxide absorbing section 21. The absorbent (a lean liquid) stored in a bottom part of the regeneration tower 40 is supplied to the carbon dioxide absorbing section 21 via an absorbent line L6. The absorbent line L6 is connected to the absorbent supply section 23. The absorbent line L6 is provided with an absorbent pump 24 that pumps the absorbent, and an absorbent cooling device 25 that cools the absorbent. In the absorbent cooling device 25, the absorbent is thermally brought into contact with a cooling medium via a heat transfer tube or the like, and heat exchange is performed between the absorbent and the cooling medium to cool the absorbent. That is, in the absorbent cooling device 25, the absorbent is not directly in contact with the cooling medium.

The absorbent is a liquid containing a carbon dioxide absorbing agent. There are not any special restrictions on a type of carbon dioxide absorbing agent, and as the carbon dioxide absorbing agent, there may be used, for example, amines such as alkanolamines represented by monoethanolamine and diethanolamine, and various alkaline aqueous solutions other than amines, such as sodium hydroxide, potassium hydroxide and calcium hydroxide.

The flue gas introduced into the absorption tower 20 via the flue gas line L3 flows upward inside the absorption tower 20 (inside the outer shell 37). The upward flowing flue gas comes in contact with the absorbent supplied by the absorbent supply section 23 from above in counter flow in the carbon dioxide absorbing section 21. Consequently, carbon dioxide in the flue gas is absorbed by the absorbent, and carbon dioxide is separated and removed from the flue gas. Note that there are not any special restrictions on the carbon dioxide absorbing section 21 as long as the section promotes gas-liquid contact between the absorbent and the flue gas. For example, the carbon dioxide absorbing section 21 may be formed of a packed bed filled with a filler of a given material, or constituted by one or more trays.

The absorbent including carbon dioxide absorbed in the carbon dioxide absorbing section 21 falls to a bottom part of the absorption tower 20. The absorbent falling to the bottom part of the absorption tower 20 is stored in the bottom part. The absorbent stored in this bottom part has a carbon dioxide concentration higher than that of the absorbent stored in the bottom part of the regeneration tower 40. In the following description, the absorbent that absorbs carbon dioxide and has the high carbon dioxide concentration will be referred to as a rich liquid.

The absorption tower 20 is provided with a level meter 20*a* that detects a height (a level) of a liquid surface of the absorbent stored in the bottom part.

The washing section 22 washes the flue gas to recover the carbon dioxide absorbing agent included in the flue gas from which carbon dioxide is removed. The washing section 22 includes a first washing section 26 disposed on an upstream side in flue gas flow, and a second washing section (a flue gas washing section) 32 disposed on a downstream side of the first washing section 26. The first washing section 26 has the purpose of washing the flue gas as well as a purpose of cooling the flue gas. Note that a demister to remove mist in the flue gas may be provided between the first washing section 26 and the second washing section 32.

The first washing section 26 includes a first flue gas washing section 27, a first washing water supply section 28 that supplies washing water to the first flue gas washing section 27 from above, and a first chimney tray 29 provided below the first flue gas washing section 27.

The flue gas passing through the carbon dioxide absorbing section 21 is guided to the first flue gas washing section 27 through an opening of the first chimney tray 29. The first chimney tray 29 has a configuration where a gas can pass upward from below through the opening, and a liquid cannot pass downward from above.

The first flue gas washing section 27 is supplied with the washing water from above by the first washing water supply section 28. In the first flue gas washing section 27, the washing water comes in contact with the flue gas, and the flue gas is accordingly washed and cooled. When the flue gas is washed, the carbon dioxide absorbing agent included in the flue gas is dissolved in the washing water. Consequently, the carbon dioxide absorbing agent can be recovered from the flue gas. The washing water descending from the first flue gas washing section 27 is stored in the first chimney tray 29.

The first washing section 26 is provided with a second circulation line L7 that guides, to the first washing water supply section 28, the washing water stored in the first chimney tray 29. The second circulation line L7 is provided with a first washing water pump 30, and a washing water cooling device 31 that cools the washing water. In the washing water cooling device 31, the washing water is thermally brought into contact with the cooling medium via the heat transfer tube or the like, and heat exchange is performed between the washing water and the cooling medium to cool the washing water. That is, in the washing water cooling device 31, the washing water is not directly in contact with the cooling medium.

The second washing section 32 includes a second flue gas washing section 33, a second washing water supply section 34 that supplies the washing water to the second flue gas washing section 33 from above, and a second chimney tray 35 provided below the second flue gas washing section 33.

The flue gas passing through the first washing section 26 is guided to the second flue gas washing section 33 through an opening of the second chimney tray 35. The second chimney tray 35 has a configuration where the gas can pass upward from below through the opening, and the liquid cannot pass downward from above.

The second washing water supply section 34 supplies the washing water to the second flue gas washing section 33 from above. In the second flue gas washing section 33, the washing water comes in contact with the flue gas, and the flue gas is accordingly washed. The washing water descending from the second flue gas washing section 33 is stored in the second chimney tray 35.

The second washing section 32 is provided with a third circulation line L8 that guides, to the second washing water supply section 34, the washing water stored in the second chimney tray 35. The third circulation line L8 is provided with a second washing water pump 36. The third circulation line L8 is connected to the supply line L4.

The flue gas from which the carbon dioxide absorbing agent is removed in the washing section 22 is discharged to outside of the absorption tower 20 via a flue gas discharge line L9 connected to a tower top part of the absorption tower 20. The flue gas discharge line L9 is provided with a thermometer 20*b* that measures a temperature of the flue gas discharged from the absorption tower 20.

The absorbent (a rich liquid) stored in the bottom part of the absorption tower 20 is supplied from the absorption tower 20 to the regeneration tower 40 via a rich liquid line L10. The rich liquid line L10 is provided with a rich liquid pump 38 to pump a rich absorbent to the regeneration tower 40. Furthermore, the rich liquid line L10 is provided with a heat exchanger 39 to perform heat exchange between the rich liquid flowing through the rich liquid line L10 and the absorbent flowing through the absorbent line L6. The heat exchanger 39 performs heat exchange between a comparatively hot absorbent and the rich liquid, to cool the absorbent and heat the rich liquid. Thus, the rich liquid is heated, so that regeneration of the absorbent (the rich liquid) in the regeneration tower 40 described later can be promoted.

The regeneration tower 40 includes an outer shell 41, a gas-liquid contact section 42 accommodated in the outer shell 41, a rich liquid supply section 43 that supplies the rich liquid to the gas-liquid contact section 42 from above, and a third chimney tray 44 provided below the gas-liquid contact section 42. Furthermore, the regeneration tower 40 includes a reflux section 45 provided above the rich liquid supply section 43, and a demister 46 provided above the reflux section 45.

The rich liquid supply section 43 supplies the rich liquid to the gas-liquid contact section 42 from above. In the gas-liquid contact section 42, the rich liquid is heated by saturated steam described later, and carbon dioxide is accordingly released from the rich liquid, to obtain an absorbent having a relatively low carbon dioxide concentration. The absorbent descending from the gas-liquid contact section 42 is received in the third chimney tray 44.

A reboiler line L11 is connected to a lower part of the regeneration tower 40. The reboiler line L11 is provided with a regeneration heater 47. Through the reboiler line L11, the absorbent stored in the third chimney tray 44 is extracted and returned to the regeneration tower 40 via the regeneration heater 47. The regeneration heater 47 performs heat exchange between the absorbent (the lean liquid) guided via the reboiler line L11 and a heating medium (e.g., the saturated steam) to heat the absorbent. The heating medium is supplied to the regeneration heater 47 via a first heating medium line L12. At least a part of the absorbent heated in the regeneration heater 47 changes phase to the saturated steam and is discharged from the regeneration heater 47 in a gas-liquid mixed phase state. The absorbent discharged from the regeneration heater 47 is guided to the lower part of the regeneration tower 40 (below the third chimney tray 44) via the reboiler line L11. The saturated steam guided to the bottom part of the regeneration tower 40 through the reboiler line L11 rises inside the regeneration tower 40 via the third chimney tray 44, for use in heating the rich liquid in the gas-liquid contact section 42 as described above.

On the other hand, the absorbent guided to the bottom part of the regeneration tower 40 via the reboiler line L11 (i.e., the absorbent that does not change phase in the regeneration heater 47) is stored in the bottom part of the regeneration tower 40. This absorbent is extracted from the bottom part of the regeneration tower 40 via the absorbent line L6 and supplied to the absorbent supply section 23 of the absorption tower 20 by the absorbent pump 24 provided in the absorbent line L6. The absorbent returned to the absorption tower 20 in this manner is for reuse as the absorbent to absorb carbon dioxide included in the flue gas in the carbon dioxide absorbing section 21. Note that the absorbent flowing through the absorbent line L6 performs heat exchange with the rich liquid flowing through the rich liquid line L10 in the heat exchanger 39 and is thereby cooled. Furthermore, the absorbent that finishes the heat exchange in the heat exchanger 39 is further cooled by the absorbent cooling device 25.

On the other hand, carbon dioxide released from the rich liquid in the gas-liquid contact section 42 flows toward the reflux section 45 provided above the gas-liquid contact section 42. Reflux water is introduced into the reflux section 45 through a first reflux water line L13 described later. The carbon dioxide introduced into the reflux section 45 comes in contact with the reflux water and is washed, so that carbon dioxide is removed. The carbon dioxide discharged from the reflux section 45 has mist removed by the demister 46. The carbon dioxide passing through the demister 46 is released from a tower top part of the regeneration tower 40 and flows into a first carbon dioxide line L14.

An upstream side of the heat exchanger 39 in the absorbent line L6 is connected to a reclaimer introduction line L15 through which a part of the absorbent distributed through the absorbent line L6 is extracted and supplied to the reclaimer 50.

The reclaimer 50 includes a storage tank 51 into which a part of the absorbent is introduced and stored, and a heating section 52 that heats the absorbent stored in the storage tank 51.

The storage tank 51 stores the absorbent introduced via the reclaimer introduction line L15, and the reflux water introduced via a second reflux water line L16 branching from the first reflux water line L13. That is, the storage tank 51 stores a liquid in which the absorbent and reflux water are mixed. A downstream end of the second reflux water line L16 is connected to the reclaimer introduction line L15. Note that the downstream end of the second reflux water line L16 may be connected to the storage tank 51.

The heating section 52 heats the absorbent (including the reflux water) stored in the storage tank 51 by heat exchange with the heating medium (e.g., the saturated steam). The heating medium is supplied to the heating section 52 via a second heating medium line L17. A part of the absorbent heated in the heating section 52 changes phase to the saturated steam and is discharged from the storage tank 51. The absorbent discharged from the storage tank 51 is guided to the lower part of the regeneration tower 40 (below the third chimney tray 44) via a reclaimer discharge line L18. The saturated steam guided from the reclaimer discharge line L18 to the lower part of the regeneration tower 40 rises inside the regeneration tower 40 via the third chimney tray 44, for use in heating the rich liquid in the gas-liquid contact section 42 as described above.

On the other hand, the deteriorated material (the impurities) included in the absorbent has a boiling point higher than that of the absorbent and is not vaporized by the heating of the heating section 52. Therefore, the deteriorated material is not discharged through the reclaimer discharge line L18 and remains in the storage tank 51. The deteriorated material accumulated in the storage tank 51 is extracted from the storage tank 51 via a deteriorated material discharge line L19. The deteriorated material extracted from the storage tank 51 is separately treated.

The carbon dioxide treatment unit 60 treats carbon dioxide discharged from the regeneration tower 40. The carbon dioxide treatment unit 60 includes a condenser 61 provided in the first carbon dioxide line L14, a reflux water drum 70 to which carbon dioxide discharged from the condenser 61 is guided, and a carbon dioxide washing tower 62 to which carbon dioxide discharged from the reflux water drum 70 is guided. Furthermore, the carbon dioxide treatment unit 60 includes a compressor 63 that compresses carbon dioxide discharged from the carbon dioxide washing tower 62, a carbon dioxide cooling device 64 that cools carbon dioxide compressed by the compressor 63, and a drum 65 that separates water from carbon dioxide cooled by the carbon dioxide cooling device 64.

The condenser 61 cools carbon dioxide distributed through the first carbon dioxide line L14, and condenses water included in carbon dioxide. The carbon dioxide cooled in the condenser 61 is guided to the reflux water drum 70 via the first carbon dioxide line L14.

The reflux water drum 70 separates carbon dioxide and water that is condensed in the condenser 61. The carbon dioxide of a gas phase introduced into the reflux water drum 70 rises inside the reflux water drum 70 and is discharged from the reflux water drum 70. The carbon dioxide discharged from the reflux water drum 70 is guided to the carbon dioxide washing tower 62 via a second carbon dioxide line L29. The condensed water introduced into the reflux water drum 70 is stored in a bottom part of the reflux water drum 70.

The first reflux water line L13 is connected to the bottom part of the reflux water drum 70. The condensed water stored in the reflux water drum 70 is extracted from the bottom part of the reflux water drum 70 via the first reflux water line L13, and is supplied as the reflux water to the reflux section 45 of the regeneration tower 40 by a reflux water pump 69 provided in the first reflux water line L13. Note that as described above, the second reflux water line L16 is connected to the first reflux water line L13.

The carbon dioxide washing tower 62 washes carbon dioxide. The carbon dioxide washing tower 62 includes an outer shell 66, a carbon dioxide washing section 67 accommodated in the outer shell 66, and a third washing water supply section 68 that supplies washing water to the carbon dioxide washing section 67 from above. When the absorbent is regenerated in the regeneration tower 40, a carbon dioxide gas is released from the rich liquid. The carbon dioxide released from the rich liquid is washed in the reflux section 45, but it is difficult to completely recover the carbon dioxide absorbing agent in the reflux section 45. Consequently, carbon dioxide discharged from the regeneration tower 40 includes a small amount of carbon dioxide absorbing agent. The carbon dioxide washing section 67 washes carbon dioxide with the washing water, to remove the carbon dioxide absorbing agent that remains in carbon dioxide.

The carbon dioxide introduced into the carbon dioxide washing tower 62 rises to be introduced into the carbon dioxide washing section 67. The carbon dioxide washing section 67 is supplied with the washing water from above by the third washing water supply section 68. In the carbon dioxide washing section 67, the washing water comes in contact with carbon dioxide, and carbon dioxide is washed. The washing water descending from the carbon dioxide washing section 67 is stored in a bottom part of the carbon dioxide washing tower 62.

A washing water discharge line L26 is connected to the bottom part of the carbon dioxide washing tower 62. The washing water stored in the carbon dioxide washing tower 62 is extracted from the bottom part of the carbon dioxide washing tower 62 via the washing water discharge line L26, and supplied to the supply line L4 by a pump (not shown) provided in the washing water discharge line L26.

On the other hand, carbon dioxide washed in the carbon dioxide washing section 67 is discharged from a top part of the carbon dioxide washing tower 62. The carbon dioxide discharged from the carbon dioxide washing tower 62 is introduced into the compressor 63 via a third carbon dioxide line L20. The compressor 63 compresses introduced carbon dioxide. The carbon dioxide compressed by the compressor 63 is introduced into the carbon dioxide cooling device 64 via a fourth carbon dioxide line L21. In the carbon dioxide cooling device 64, heat exchange is performed between carbon dioxide and the cooling medium to cool carbon dioxide. The cooled carbon dioxide is introduced into the drum 65 via a fifth carbon dioxide line L22. The drum 65 separates carbon dioxide and condensed water. The condensed water separated by the drum 65 is discharged to the outside via a condensed water discharge line L24 connected to a bottom part of the drum 65. Furthermore, carbon dioxide separated by the drum 65 is released to the outside via a sixth carbon dioxide line L23 connected to a top part of the drum 65.

Next, description will be made as to the supply line L4 and the discharge line L5 in detail.

The supply line L4 guides the circulating water to the second washing section 32 of the absorption tower 20. An upstream end of the supply line L4 is connected to the first circulation line L2. Specifically, the upstream end of the supply line L4 is connected to a downstream side of the circulating water pump 14 and an upstream side of the circulating water cooling device 15 in the first circulation line L2. Note that the upstream end of the supply line L4 may be connected to a downstream side of the circulating water cooling device 15 in the first circulation line L2. Furthermore, a downstream end of the supply line L4 is connected to the third circulation line L8.

An upstream end of a washing water supply line (a washing water channel) L25 is connected to a middle position of the supply line L4. Through the washing water supply line L25, a part or all of the circulating water distributed through the supply line L4 is supplied to the third washing water supply section 68 of the carbon dioxide washing tower 62. Furthermore, a downstream end of the washing water discharge line L26 is connected to the supply line L4. Specifically, the downstream end of the washing water discharge line L26 is connected to a downstream side of a connecting position of the supply line L4 to the washing water supply line L25 in the supply line L4. Furthermore, the washing water discharge line L26 guides, to the supply line L4, the washing water stored in the bottom part of the carbon dioxide washing tower 62. Note that the supply line L4 may be connected to an upstream end of a reclaimer line (a reclaimer channel) L27. A downstream end of the reclaimer line L27 is connected to the second reflux water line L16. Through the reclaimer line L27, a part or all of the circulating water distributed through the supply line L4 is supplied to the reclaimer 50 via the second reflux water line L16. Furthermore, the washing water supply line L25 and the washing water discharge line L26 may be omitted.

Note that as shown by a broken line in FIG. 1, the supply line L4 may be provided with an impurity removal unit (a capture unit) 17. The impurity removal unit 17 is provided on an upstream side of a connecting position of the supply line L4 to the washing water supply line L25 in the supply line L4. The impurity removal unit 17 captures impurities (e.g., sulfur dioxide ($SO_2$), nitrogen dioxide ($NO_2$), dust and soot, etc.) included in the circulating water. The impurity removal unit 17 may be made of, for example, an ion exchange resin that removes an ion component. Furthermore, the impurity removal unit 17 may be a filter that removes, for example, suspended solids (SS). Alternatively, the impurity removal unit 17 may be, for example, a RO film, or an activated carbon filter.

The discharge line L5 guides the circulating water to the outside of the system. The outside of the system means outside of the main flow in the flue gas cooling tower 10, the absorption tower 20 and the regeneration tower 40 in the carbon dioxide recovery apparatus 1. Furthermore, the main flow may be flow of delivery of a fluid (the flue gas, the circulating water, the absorbent or the like) to be performed between the respective towers so that the flue gas cooling tower 10, the absorption tower 20 and the regeneration tower 40 exert functions.

An upstream end of the discharge line L5 is connected to the first circulation line L2. Specifically, the upstream end of the discharge line L5 is connected to the downstream side of the circulating water pump 14 and the upstream side of the circulating water cooling device 15 in the first circulation line L2. Note that the upstream end of the discharge line L5 may be connected to the downstream side of the circulating water cooling device 15 in the first circulation line L2.

Figure 2:
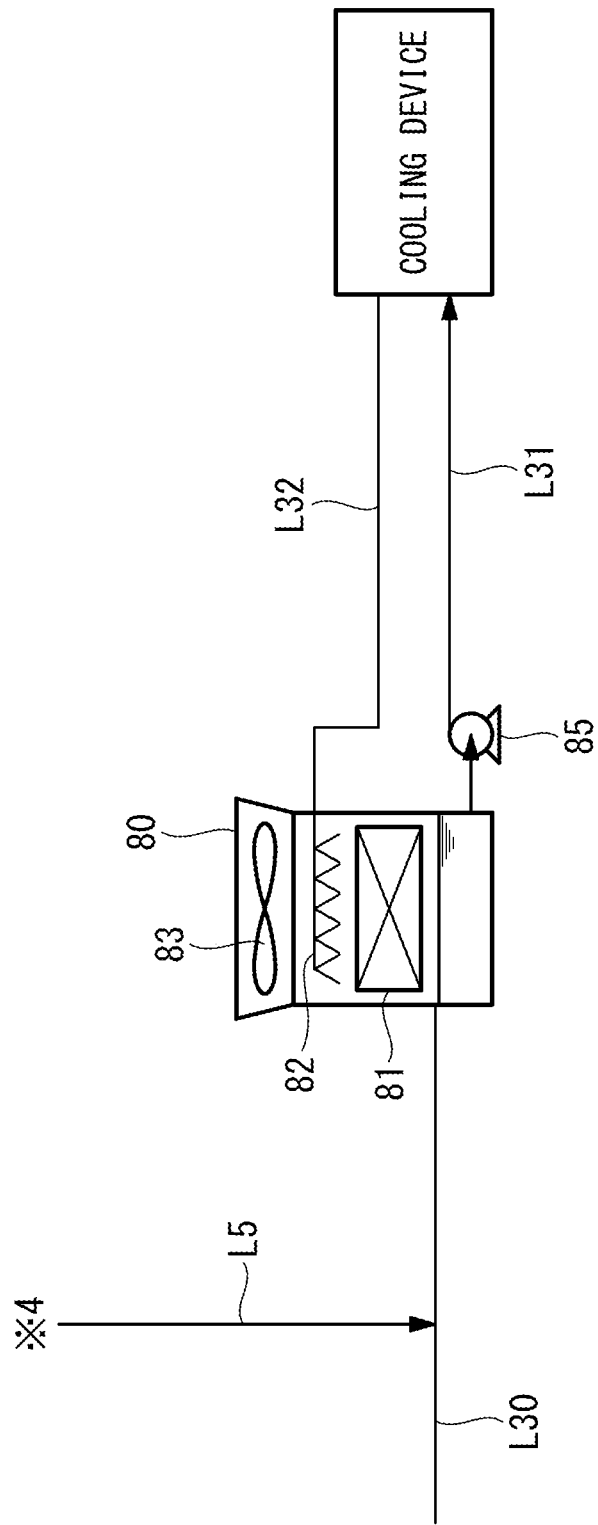
FIG. 2 is a schematic configuration diagram of a cooling tower provided in the carbon dioxide recovery apparatus of FIG. 1.

Furthermore, a downstream end of the discharge line L5 through which the circulating water is discharged to the outside of the system may be connected to a cooling tower system to replenish water to a cooling tower 80 that manufactures the cooling medium (e.g., the cooling water). Specifically, as shown in FIG. 2, the downstream end of the discharge line L5 may be connected to a middle position of a replenishing water line L30 that supplies replenishing water to the cooling tower 80. That is, the circulating water discharged to the outside of the system via the discharge line L5 is guided to the cooling tower 80, for use as the replenishing water in the cooling tower.

The cooling tower 80 includes a heat exchange section 81, a cooling medium supply section 82 that supplies the cooling medium to the heat exchange section 81, and a fan 83 that introduces and discharge outside air into and from the cooling tower 80. The cooling tower 80 cools the cooling medium to cool a fluid (e.g., the circulating water, the absorbent, carbon dioxide or the like) distributed inside a carbon dioxide recovery apparatus 100. Specifically, in the cooling tower 80, heat exchange is performed between the cooling medium for use in various types of cooling devices (the circulating water cooling device 15, the absorbent cooling device 25, the carbon dioxide cooling device 64, etc.) provided in the carbon dioxide recovery apparatus 100 and another cooling fluid (e.g., the outside air) in the heat exchange section 81, to cool the cooling medium. The cooling medium supply section 82 provided above the heat exchange section 81 supplies the cooling medium to the heat exchange section 81. Furthermore, the cooling medium that finishes the heat exchange in the heat exchange section 81 is stored in a lower part of the cooling tower 80. Note that FIG. 2 collectively shows, as a cooling device, various types of cooling devices (the circulating water cooling device 15, the absorbent cooling device 25, the carbon dioxide cooling device 64, etc.) provided in the carbon dioxide recovery apparatus 100.

The cooling medium is circulated between the cooling tower 80 and the cooling device (the circulating water cooling device 15, the absorbent cooling device 25, the carbon dioxide cooling device 64 or the like). The cooling medium is circulated between a first cooling medium line L31 that guides the cooling medium from the cooling tower 80 to the cooling device and a second cooling medium line L32 that guides the cooling medium from the cooling device to the cooling tower 80. The first cooling medium line L31 guides the cooling medium stored in the cooling tower 80 to the cooling device. The second cooling medium line L32 guides the cooling medium from the cooling device to the cooling medium supply section 82. The circulating cooling medium is heated by heat exchange with the fluid in each cooling device. Furthermore, the circulating cooling medium is cooled by performing heat exchange with another cooling fluid in the cooling tower 80. The first cooling medium line L31 is provided with a cooling medium pump 85 as a drive source that circulates the cooling medium.

In the cooling tower 80, the cooling medium decreases with the cooling of the cooling medium. Therefore, to supplement the cooling medium, the replenishing water is supplied to the cooling tower via the replenishing water line L30. The circulating water distributed through the discharge line L5 is supplied as a part of the replenishing water to the cooling tower 80.

As shown in FIG. 1, the discharge line L5 is provided with a flowmeter 10*b* that measures a flow rate of the circulating water distributed through the discharge line L5. Furthermore, the discharge line L5 is provided with an on-off valve 10*a*. The on-off valve 10*a* switches to an opened state and a closed state, to switch to a state where the circulating water is distributed through the discharge line L5 and a state where the circulating water is not distributed through the discharge line L5. Note that in place of the on-off valve 10*a*, a flow regulating valve may be provided. In the flow regulating valve, an opening position is adjusted, to adjust the flow rate of the circulating water distributed inside. The opening position of the flow regulating valve includes an opening position 100% (a fully opened state) and an opening position 0% (a fully closed state).

Furthermore, the carbon dioxide recovery apparatus 1 includes a control device. The control device receives information transmitted from the thermometer 20*b*, the flowmeter 10*b* and the level meter 20*a*. Additionally, the control device controls the opening position of the on-off valve 10*a*, and increase and decrease of a capacity of the washing water cooling device 31 installed in the second circulation line L7 of the first washing section 26. There are not any special restrictions on a method of adjusting the capacity of the washing water cooling device 31 installed in the second circulation line L7. Examples of a method of adjusting the washing water cooling device 31 installed in the second circulation line L7 include a method of bypassing a process side, and a method of adjusting a supply amount of the washing water to be supplied to the washing water cooling device 31 installed in the second circulation line L7. In addition, the control device controls an amount of the absorbent to be stored in the bottom part of the absorption tower 20 so that the height of the liquid surface of the absorbent stored in the bottom part of the absorption tower 20 reaches a predetermined height.

The control device is constituted of, for example, a central processing unit (CPU), a random access memory (RAM), a read only memory (ROM), a computer readable storage medium and others. Furthermore, as an example, a series of processing to achieve various functions is stored in a program form in the storage medium or the like, this program is read to the RAM or the like by the CPU, and processing and computation of the information are executed, to achieve various functions. Note that the program may be applied in a form of being beforehand installed in the ROM or another storage medium, a form of being provided in a stored state in the computer readable storage medium, a form of distributed via wired or wireless communication means, or the like. Examples of the computer readable storage medium include a magnetic disk, a magneto-optical disk, a CD-ROM, a DVD-ROM, and a semiconductor memory.

Next, processing to be performed by a control device will be described.

The control device performs processing of keeping an amount of water inside the system (inside the main flow in the flue gas cooling tower 10, the absorption tower 20 and the regeneration tower 40) in a predetermined range (hereinafter, to keep the amount of water inside the system in the predetermined range will be referred to as "to keep water balance"), and keeping the concentration of the absorbent in a predetermined range.

The control device determines whether or not the water balance is kept, based on information transmitted from the level meter 20a. Specifically, in a case where the height of the liquid surface of the absorbent stored in the bottom part of the absorption tower 20 is in a predetermined range, the control device determines that the water balance is kept. Furthermore, in a case where the height of the liquid surface of the absorbent stored in the bottom part of the absorption tower 20 is out of the predetermined range, the control device determines that the water balance is not kept. Particularly, in a case where the height of the liquid surface of the absorbent is higher than the predetermined range, the control device determines that the amount of water inside the system is larger than the predetermined range. If the control device determines that the amount of water inside the system is larger than the predetermined range, the control device reduces a capacity of the first washing section 26 so that the temperature measured with the thermometer 20b becomes a predetermined temperature. That is, the temperature of the flue gas passing through the first washing section 26 is raised. Furthermore, if the capacity of the first washing section 26 is reduced, the water balance is not kept (i.e., the height of the liquid surface of the absorbent is higher than the predetermined range), and in this case, the control device brings the flow regulating valve into the opened state.

Note that the control method described above is an example, and the processing to be performed by the control device is not limited to this example.

Next, the amount of water inside the system in the carbon dioxide recovery apparatus 1 of the present embodiment will be described. In the following description, the amount of water to be included in the flue gas introduced into the flue gas cooling tower 10 through the flue gas introduction line L1 will be referred to as W1. The amount of water to be included in the flue gas discharged from the flue gas cooling tower 10 and introduced into the absorption tower 20 via the flue gas line L3 will be referred to as W2. The amount of circulating water to be supplied to the second washing section 32 of the absorption tower 20 via the supply line L4 will be referred to as W3. The amount of water to be included in the flue gas discharged from the absorption tower 20 via the flue gas discharge line L9 will be referred to as W4. The amount of water to be included in the flue gas discharged from the carbon dioxide absorbing section 21 of the absorption tower 20 before introduced into the first washing section 26 will be referred to as W5. The amount of circulating water to be discharged to the outside of the system via the discharge line L5 will be referred to as W6.

In the carbon dioxide recovery apparatus 1 of the present embodiment, in a state where the circulating water is not discharged to the outside of the system via the discharge line L5 (i.e., a state where W6=0) and a state where the water balance is kept, Equation (1) is established as follows.

$$W1=W2+W3=W4 \quad (1)$$

Note that strictly, carbon dioxide discharged from the regeneration tower 40 also includes a small amount of water, and hence W4 is smaller than W1 and W2+W3, but the following will be described based on Equation (1) above to simplify the description.

The amount W1 changes in accordance with a state of a device that discharges the flue gas, or the like. In the present embodiment, the same amount of circulating water as the amount of condensed water condensed in the gas-liquid contact section 12 of the flue gas cooling tower 10 is not always supplied to the second washing section 32 via the supply line L4, and a part of the circulating water is discharged to the outside of the system via the discharge line L5 as required so that Equation (2) is always established as follows. In other words, W6 is adjusted so that Equation (2) is always established as follows.

$$W5>W4 \quad (2)$$

Furthermore, in the present embodiment, following the above adjustment, the temperature of the flue gas discharged from the flue gas cooling tower 10 and introduced into the absorption tower 20 via the flue gas line L3 is set to about 40° C., the temperature of the flue gas discharged from the carbon dioxide absorbing section 21 of the absorption tower 20 before introduced into the first washing section 26 is set to about 50° C., and the temperature of the flue gas discharged from the absorption tower 20 via the flue gas discharge line L9 is set to about 45° C.

According to the present embodiment, the following effects are produced.

In the carbon dioxide recovery apparatus 1, the concentration of the absorbent inside the system changes in accordance with the amount of water inside the system. In the carbon dioxide recovery apparatus 1, for suitably absorbing carbon dioxide in the carbon dioxide absorbing section 21, it is necessary to keep the water balance inside the system and to keep the concentration of the absorbent in the predetermined range.

In the present embodiment, the discharge line L5 that discharges the circulating water to the outside of the system is provided. Consequently, for example, even in a case where the water balance cannot be kept only by guiding the circulating water to the washing section 22 via the supply line L4, a part of the circulating water is discharged to the outside of the system through the discharge line L5, and the water balance inside the system can be kept. Therefore, the concentration of the absorbent can be kept in the predetermined range, and carbon dioxide can be suitably absorbed in the carbon dioxide absorbing section 21. That is, in the present embodiment, even in a case where W1 is large, the amount of water inside the system can be adjusted by adjusting W6. In this way, the water balance inside the system can be suitably kept.

Furthermore, in the present embodiment, the water balance inside the system can be kept only by providing the discharge line L5. In this case, for example, the carbon dioxide recovery apparatus 1 can have a simple structure as compared with a case where the condensed water supplied to the carbon dioxide absorbing section 21 via the supply line L4 is heated and evaporated to keep the water balance inside the system. Therefore, increase in the initial cost and running cost of the whole carbon dioxide recovery apparatus 1 can be suppressed.

Furthermore, in the present embodiment, the circulating water discharged to the outside of the system is used for the cooling tower in cooling the cooling medium that cools the circulating water. In this case, an amount of water for use in the whole carbon dioxide recovery apparatus can be decreased, as compared with a case where the circulating water discharged to the outside of the system is discarded without being used.

In the condensed water in which water included in the flue gas is condensed, the impurities included in the flue gas (e.g., sulfur dioxide ($SO_2$), nitrogen dioxide ($NO_2$), dust and soot, etc.) are mixed. Therefore, the impurities are mixed in the circulating water included in the condensed water. In the present embodiment, in a case where the supply line L4 is provided with the impurity removal unit 17 as shown by a broken line in FIG. 1, the impurities mixed in the circulating water distributed through the supply line L4 can be captured. Therefore, the circulating water from which the impurities are removed can be supplied to the second washing section 32.

Furthermore, in the present embodiment, the circulating water distributed through the supply line L4 is supplied as the washing water to the carbon dioxide washing section 67. The circulating water is not in contact with the absorbent. Consequently, the circulating water does not include any components (e.g., amine and the like) of the carbon dioxide absorbing agent. Therefore, water (the circulating water) that does not include any components of the carbon dioxide absorbing agent can be supplied to the carbon dioxide washing section 67. Thus, in the carbon dioxide washing section 67, carbon dioxide can be suitably washed.

Additionally, in the present embodiment, the circulating water is guided to the second washing section 32 via the supply line L4, so that the temperature of the flue gas (about 45° C.) discharged from the absorption tower 20 via the flue gas discharge line L9 is higher than the temperature of the flue gas (about 40° C.) introduced into the absorption tower 20, while inhibiting dilution and keeping the concentration of the absorbent. Consequently, the amount of the flue gas cooling water required to cool the flue gas can be decreased.

[Modification 1]

Figure 3:
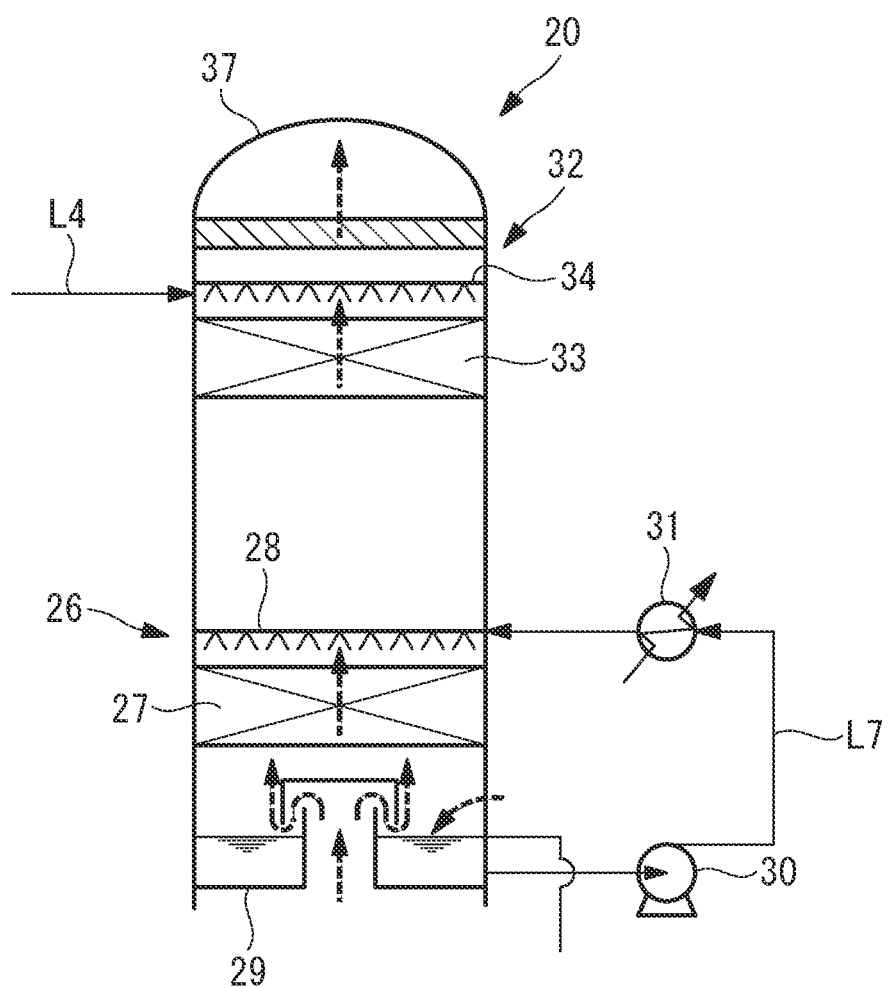
FIG. 3 is a main part enlarged view showing a modification of a flue gas absorption tower provided in the carbon dioxide recovery apparatus of FIG. 1.

Next, a modification of the present embodiment will be described with reference to FIG. 3.

A cooling tower is not limited to the structure described above. For example, as shown in FIG. 3, the third circulation line L8, the second chimney tray 35 and the second washing water pump 36 may be omitted. In this case, a downstream end of a supply line L4 is connected to a second washing water supply section 34. That is, circulating water supplied via the supply line L4 is only supplied to the second washing water supply section 34. In this case, a demister is not provided between a first washing section 26 and a second washing section 32.

In such a configuration, washing water (the circulating water) falling from a second flue gas washing section 33 passes through a first flue gas washing section 27, and is stored in a first chimney tray 29.

In the present embodiment, the circulating water is supplied to the second flue gas washing section 33. Consequently, a comparatively large amount of water can be supplied to the second flue gas washing section 33. Therefore, the flue gas can be washed without circulating flue gas washing water in the second flue gas washing section 33. Even in a structure that does not include a device that circulates the flue gas washing water, the flue gas can be suitably washed. Therefore, the structure can be simplified as compared with a case where the structure includes the device that circulates the flue gas washing water.

[Modification 2]

Figure 4:
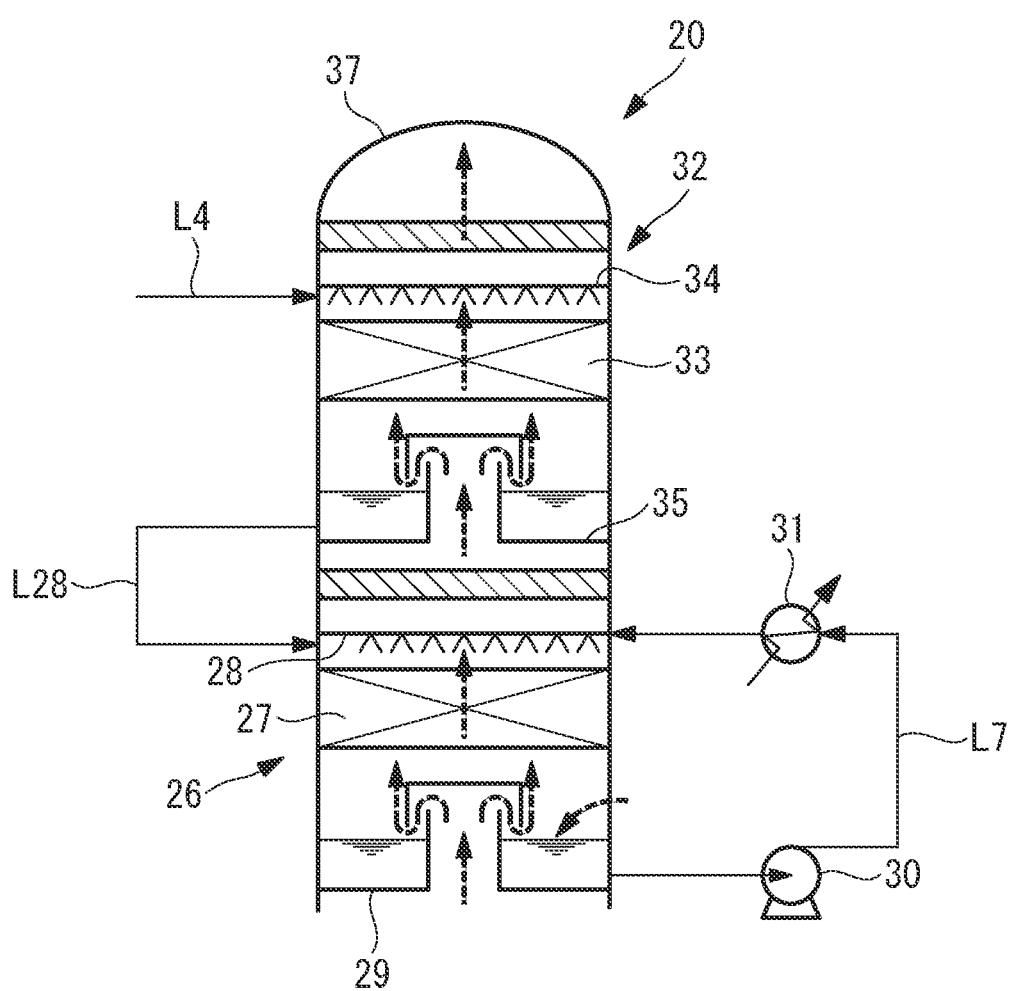
FIG. 4 is a main part enlarged view showing a modification of a flue gas absorption tower provided in the carbon dioxide recovery apparatus of FIG. 1.

Note that as shown in FIG. 4, the third circulation line L8 and the second washing water pump 36 may only be omitted without omitting the second chimney tray 35. In this case, provided is a washing water line L28 that guides, to a first washing water supply section 28, flue gas washing water stored in the second chimney tray 35.

In this configuration, washing water (circulating water) falling from a second flue gas washing section 33 is stored in the second chimney tray 35. The washing water stored in the second chimney tray 35 is supplied to the first washing water supply section 28 via the washing water line L28 and supplied to a first flue gas washing section 27 by the first washing water supply section 28.

Even in this case, the structure can be simplified as compared with a case where the structure includes a device that circulates the flue gas washing water.

Second Embodiment

Next, description will be made as to a carbon dioxide recovery apparatus 100 according to a second embodiment of the present disclosure with reference to FIG. 5.

The carbon dioxide recovery apparatus 100 according to the present embodiment is different from the carbon dioxide recovery apparatus 1 according to the first embodiment in that a second washing section 32 is not provided in an absorption tower 20. In the other respects, the present embodiment is similar to the first embodiment, and hence the same configuration is denoted with the same reference signs and detailed description is omitted.

Figure 5:
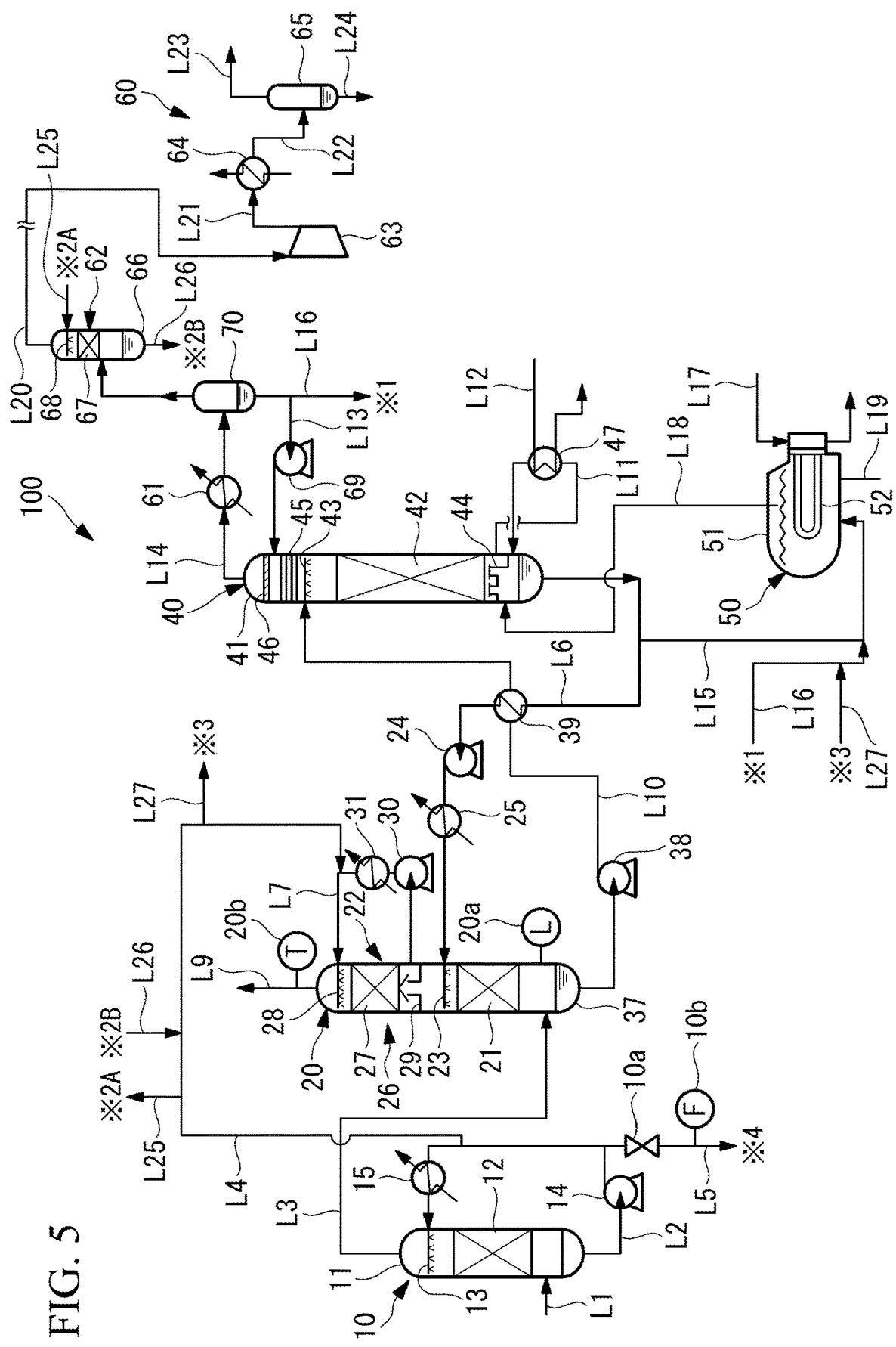
FIG. 5 is a schematic configuration diagram of a carbon dioxide recovery apparatus according to a second embodiment of the present disclosure.

A washing section 22 of the absorption tower 20 according to the present embodiment only includes a first washing section 26 as shown in FIG. 5. Furthermore, in the present embodiment, a downstream end of a supply line L4 is connected to a second circulation line L7.

Even the carbon dioxide recovery apparatus 100 according to the present embodiment produces effects similar to those of the first embodiment.

Third Embodiment

Next, description will be made as to a carbon dioxide recovery apparatus 200 according to a third embodiment of the present disclosure with reference to FIG. 6.

The carbon dioxide recovery apparatus 200 according to the present embodiment is different from the carbon dioxide recovery apparatus 1 according to the first embodiment in that a cooling absorption tower 210 is provided in place of the flue gas cooling tower 10 and the absorption tower 20. In the other respects, the present embodiment is similar to the first embodiment, and hence the same configuration is denoted with the same reference signs and detailed description is omitted.

Figure 6:
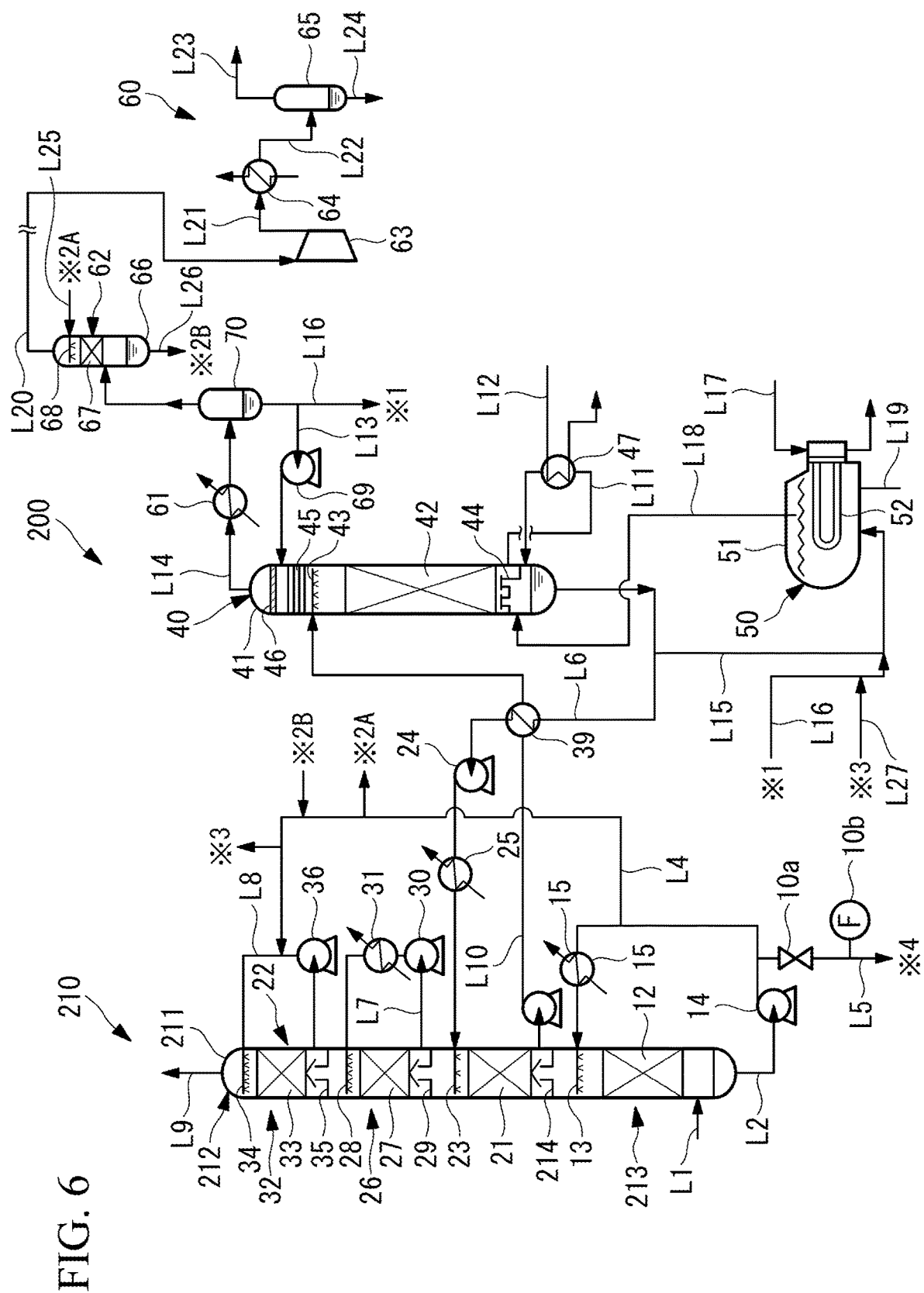
FIG. 6 is a schematic configuration diagram of a carbon dioxide recovery apparatus according to a third embodiment of the present disclosure.

The carbon dioxide recovery apparatus 200 according to the present embodiment includes the cooling absorption tower 210 as shown in FIG. 6. In the cooling absorption tower 210, the flue gas cooling tower 10 and absorption tower 20 according to the first embodiment are integrated.

Furthermore, in the carbon dioxide recovery apparatus 200 according to the present embodiment, the flue gas cooling tower 10 and the absorption tower 20 are integrated, and hence a flue gas line L3 connecting the flue gas cooling tower 10 and the absorption tower 20 is omitted.

The cooling absorption tower 210 includes an outer shell 211, and a flue gas cooling unit 212 and an absorption unit 213 that are accommodated in the outer shell 211. The absorption unit 213 is provided above the flue gas cooling unit 212. In the cooling absorption tower 210, a flue gas introduced from a lower part is first cooled in the flue gas cooling unit 212. The flue gas cooled in the flue gas cooling unit 212 flows upward through the outer shell and is introduced into the absorption unit 213. From the flue gas introduced into the absorption unit 213, carbon dioxide is absorbed, and the flue gas is discharged from a top part of the cooling absorption tower 210.

The absorption unit 213 according to the present embodiment includes a structure similar to the carbon dioxide absorbing section 21, the washing section 22 and others provided in the absorption tower 20 of the first embodiment. Therefore, the structure is denoted with reference signs similar to those of the carbon dioxide absorbing section 21, the washing section 22 and others of the first embodiment, and detailed description is omitted.

Furthermore, the absorption unit 213 according to the present embodiment includes a fourth chimney tray 214 below a carbon dioxide absorbing section 21. In the fourth chimney tray 214, absorbent falling from the carbon dioxide absorbing section 21 is stored. The absorbent (a rich liquid) stored in the fourth chimney tray 214 is guided to a regeneration tower 40 via a rich liquid line L10.

Additionally, the flue gas cooling unit 212 according to the present embodiment includes a structure similar to the gas-liquid contact section 12, the cooling water supply section 13 and others provided in the flue gas cooling tower 10 of the first embodiment. Therefore, the structure is denoted with reference signs similar to those of the gas-liquid contact section 12, the cooling water supply section 13 and others of the first embodiment, and detailed description is omitted.

A first circulation line L2 according to the present embodiment guides, to a cooling water supply section 13, flue gas cooling water (including condensed water) stored in a bottom part of the cooling absorption tower 210.

Furthermore, also in the present embodiment, the cooling absorption tower 210 is provided with a supply line L4 that guides, to a third circulation line L8, circulating water circulating through the first circulation line L2. Also provided is a discharge line L5 that guides the circulating water circulating through the first circulation line L2 to a circulating water cooling device 15 outside a system.

The present embodiment produces the following effects.

In the present embodiment, the flue gas cooling unit 212 and the absorption unit 213 located above the flue gas cooling unit 212 are accommodated in one outer shell 211. Consequently, inside one outer shell 211, a flue gas is treated in the flue gas cooling unit 212, and the flue gas can be raised and treated in the absorption unit 213. Therefore, both functions of the flue gas cooling unit 212 and the absorption unit 213 can be included in the one outer shell 211. For example, as compared with a case where the flue gas cooling unit 212 and the absorption unit 213 are accommodated in separate outer shells, an installation space for the outer shell itself, a connecting duct connecting the outer shells to each other or the like can be saved, and hence an installation area for equipment can be reduced. Furthermore, the aforementioned connecting duct and a support member for the duct are not required, and hence costs such as the material cost or production cost can be reduced.

Furthermore, in the present embodiment, the absorption unit 213 is provided above the flue gas cooling unit 212. Consequently, a part of the absorbent used in the absorption unit 213 falls and may be mixed in the circulating water for use in the flue gas cooling unit 212. In a case of discharging the circulating water in which the absorbent is mixed to outside of the carbon dioxide recovery apparatus 200, a treatment of removing the absorbent from the circulating water or the like is required, which makes a discharge treatment complicated. In the present embodiment, the supply line L4 guides the circulating water to the absorption unit 213 (a second flue gas washing section 33). Consequently, the circulating water in which the absorbent is mixed can be used again in the absorption unit 213. Therefore, an amount of circulating water to be discharged to the outside of the carbon dioxide recovery apparatus 200 can be decreased, which does not require the discharge treatment to be complicated.

Note that the present disclosure is not limited only to the above configurations of the respective embodiments and can be appropriately modified or improved without departing from the scope of the present disclosure. The embodiments modified or improved in this manner are also to be construed to be included in the scope of rights of the present disclosure.

For example, in the above respective embodiments, the example has been described where the upstream ends of the supply line L4 and discharge line L5 are connected to the first circulation line L2, but the present disclosure is not limited to this example. For example, the upstream ends of the supply line L4 and discharge line L5 may be connected to the bottom part of the flue gas cooling tower 10 or the cooling absorption tower 210.

Furthermore, for example, in a case where the flue gas to be treated in the carbon dioxide recovery apparatus 1 includes a large amount of sulfur dioxide as in a flue gas to be discharged from a coal fired power plant, a desulfurization device (not shown) that desulfurizes the flue gas to be introduced into the flue gas cooling tower 10 may be provided inside the outer shell of the flue gas cooling tower 10. The desulfurization device is provided below the gas-liquid contact section 12. In this case, condensed water condensed in the desulfurization device is discharged to the outside of the system through the discharge line L5, and the condensed water condensed in the gas-liquid contact section 12 may be guided to the second washing section 32 through the supply line L4. According to such a configuration, the condensed water including a large amount of sulfur components can be discharged to the outside of the system.

The cooling device described in each embodiment described above is understood, for example, as follows.

A carbon dioxide recovery apparatus according to an aspect of the present disclosure includes a cooling unit (10) that brings flue gas cooling water into contact with a flue gas to cool the flue gas, a circulation channel (L2) through which the flue gas cooling water that cools the flue gas and condensed water generated by cooling the flue gas are returned to the cooling unit, an absorption unit (20) including a carbon dioxide absorbing section (21) that brings the flue gas cooled in the cooling unit into contact with an absorbent and causes the absorbent to absorb carbon dioxide included in the flue gas, and a flue gas washing section (32) that brings the flue gas including carbon dioxide absorbed in the carbon dioxide absorbing section into contact with flue gas washing water and washes the flue gas, a regeneration unit (30) that removes carbon dioxide from the absorbent including carbon dioxide absorbed in the absorption unit, a supply channel (L4) through which circulating water circulating through the cooling unit and the circulation channel is guided as the flue gas washing water to the flue gas washing section, and a discharge channel (L5) through which the circulating water circulating through the cooling unit and the circulation channel is discharged to outside of a system.

In the carbon dioxide recovery apparatus, for suitably absorbing carbon dioxide in the absorption unit, it is necessary to keep the amount of water inside the system (within the flow in the cooling unit, the absorption unit and regeneration unit) within a predetermined range (hereinafter, to keep the amount of water inside the system within the predetermined range will be referred to as "to keep the water balance"), and to keep the concentration of the absorbent in the predetermined range.

In the above configuration, provided is the discharge channel that discharges the circulating water circulating through the cooling unit and the circulation channel to the outside of the system. Consequently, for example, even in a case where the water balance cannot be kept only by guiding the circulating water to the flue gas washing section through the supply channel, a part of the circulating water is discharged to the outside of the system through the discharge channel, and the water balance inside the system can be kept. Therefore, the concentration of the absorbent can be kept in the predetermined range, and carbon dioxide can be suitably absorbed in the absorption unit.

Furthermore, in the above configuration, the water balance inside the system can be kept only by providing the discharge channel. In this case, for example, the carbon dioxide recovery apparatus can have the simple structure as compared with the case where the condensed water supplied to the absorption unit via the supply channel is evaporated. Therefore, increase in the initial cost and running cost of the whole carbon dioxide recovery apparatus can be suppressed.

Note that the outside of the system means outside of the main flow in the cooling unit, the absorption unit and the regeneration unit of the carbon dioxide recovery apparatus. The main flow means the flow of delivery of a fluid to be performed between respective towers so that the cooling unit, the absorption unit and the regeneration unit exert functions.

Furthermore, the carbon dioxide recovery apparatus according to an aspect of the present disclosure includes a cooling tower that cools a cooling medium to cool a distributed fluid, and the discharge channel supplies, to the cooling tower, the circulating water discharged through the circulation channel as cooling water that cools the cooling medium.

In the above configuration, the circulating water discharged to the outside of the system is used for the cooling tower in cooling the cooling medium. Consequently, an amount of water for use in the whole carbon dioxide recovery apparatus can be decreased, as compared with a case where the circulating water discharged to the outside of the system is discarded without being used.

Note that the cooling medium cooled in the cooling tower may be, for example, for use in a circulating water cooling device that cools the circulating water by performing heat exchange between the circulating water and the cooling medium. Furthermore, the cooling medium may be for use in the carbon dioxide cooling device that cools carbon dioxide by performing heat exchange between carbon dioxide discharged from the regeneration unit and the cooling medium.

Furthermore, in the carbon dioxide recovery apparatus according to an aspect of the present disclosure, the supply channel is provided with a capture unit (17) that captures impurities in the circulating water distributed through the supply channel.

In condensed water in which water included in a flue gas is condensed, impurities included in the flue gas (e.g., sulfur dioxide ($SO_2$), nitrogen dioxide ($NO_2$), dust and soot, etc.) are mixed. Therefore, the impurities are mixed in the circulating water included in the condensed water. In the above configuration, the capture unit is provided in the supply channel. Consequently, the impurities mixed in the circulating water distributed through the supply channel can be captured. Therefore, the circulating water from which impurities are removed can be supplied to a flue gas washing section.

Furthermore, the carbon dioxide recovery apparatus according to an aspect of the present disclosure includes a carbon dioxide washing unit (62) that washes, with washing water, carbon dioxide discharged from the regeneration unit, and a washing water channel (L25) through which the circulating water distributed through the supply channel is supplied as the washing water to the carbon dioxide washing unit.

In the above configuration, the circulating water distributed through the supply channel is supplied as the washing water to the carbon dioxide washing unit. The circulating water is not in contact with the absorbent. Consequently, the circulating water does not include any components (e.g., amine and the like) of the absorbent. Therefore, water (the circulating water) that does not include any components of the absorbent can be supplied to the carbon dioxide washing unit. Thus, in the carbon dioxide washing unit, carbon dioxide can be suitably washed.

Note that a part of the washing water with which carbon dioxide is washed in the carbon dioxide washing unit may be returned to the supply channel and supplied to the flue gas washing unit.

Furthermore, the carbon dioxide recovery apparatus according to an aspect of the present disclosure includes a reclaimer (50) that removes impurities of the absorbent, and a reclaimer channel (L27) through which the circulating water distributed through the supply channel is supplied to the reclaimer.

In the above configuration, the circulating water distributed through the supply channel is supplied to the reclaimer. The circulating water is not in contact with the absorbent. Consequently, the circulating water does not include any components (e.g., amine and the like) of the absorbent. Therefore, water (the circulating water) that does not include any components of the absorbent can be supplied to the reclaimer.

Furthermore, in the carbon dioxide recovery apparatus according to an aspect of the present disclosure, the flue gas washing unit washes the flue gas only with the circulating water supplied through the supply channel, and the flue gas washing unit does not include a device that circulates the flue gas washing water.

In the above configuration, the circulating water is supplied to the flue gas washing unit. Consequently, a comparatively large amount of water can be supplied to the flue gas washing unit. Therefore, in the flue gas washing unit, the flue gas can be washed without circulating the flue gas washing water. Thus, even in a structure that does not include the device that circulates the flue gas washing water, the flue gas can be suitably washed. As a result, the structure can be simplified as compared with a case where the structure includes the device that circulates the flue gas washing water.

Additionally, the carbon dioxide recovery apparatus according to an aspect of the present disclosure includes an outer shell (211) that accommodates the cooling unit and the absorption unit, and the absorption unit is provided above the cooling unit.

In the above configuration, one outer shell accommodates the cooling unit and the absorption unit located above the cooling unit. Consequently, in one outer shell, a flue gas is treated in the cooling unit, and then the flue gas can be raised and treated in the absorption unit. Therefore, both functions of the cooling unit and the absorption unit can be included in the one outer shell. For example, as compared with a case where the cooling unit and the absorption unit are accommodated in separate outer shells, an installation space for the outer shell itself, a connecting duct connecting the outer shells to each other or the like can be saved, and hence an installation area for equipment can be reduced. Furthermore, the aforementioned connecting duct and a support member for the duct are not required, and hence costs such as the material cost or production cost can be reduced.

Furthermore, in the above configuration, the absorption unit is provided above the cooling unit. Consequently, a part of the absorbent used in the absorption unit falls and may be mixed in the circulating water for use in the cooling unit. In a case of discharging the circulating water in which the absorbent is mixed to outside of the carbon dioxide recovery apparatus, a treatment of removing the absorbent from the circulating water or the like is required, which makes a discharge treatment complicated. In the above configuration, the supply channel guides the circulating water to the absorption unit (a flue gas washing section). Consequently, the circulating water in which the absorbent is mixed can be used again in the absorption unit. Therefore, an amount of circulating water to be discharged to the outside of the carbon dioxide recovery apparatus can be decreased, which does not require the discharge treatment to be complicated.

REFERENCE SIGNS LIST 1 carbon dioxide recovery apparatus
10 flue gas cooling tower (flue gas cooling unit)
10a on-off valve
10b flowmeter
11 outer shell
12 gas-liquid contact section
13 cooling water supply section
14 circulating water pump
15 circulating water cooling device
17 impurity removal unit (capture unit)
20 absorption tower (absorption unit)
20a level meter
20b thermometer
21 carbon dioxide absorbing section
22 washing section (flue gas washing unit)
23 absorbent supply section
24 absorbent pump
25 absorbent cooling device
26 first washing section
27 first flue gas washing section
28 first washing water supply section
29 first chimney tray
30 first washing water pump
31 washing water cooling device
32 second washing section
33 second flue gas washing section
34 second washing water supply section
35 second chimney tray
36 second washing water pump
37 outer shell
38 rich liquid pump
39 heat exchanger
40 regeneration tower (regeneration unit)
41 outer shell
42 gas-liquid contact section
43 rich liquid supply section
44 third chimney tray
45 reflux section
46 demister
47 regeneration heater
50 reclaimer
51 storage tank
52 heating section
60 carbon dioxide treatment unit
61 condenser
62 carbon dioxide washing tower
63 compressor
64 carbon dioxide cooling device
65 drum
66 outer shell
67 carbon dioxide washing section
68 third washing water supply section
69 reflux water pump
100 carbon dioxide recovery apparatus
200 carbon dioxide recovery apparatus
210 cooling absorption tower
211 outer shell
212 cooling unit
213 absorption unit
214 fourth chimney tray
L1 flue gas introduction line
L2 first circulation line (circulation channel)
L3 flue gas line
L4 supply line (supply channel)
L5 discharge line (discharge channel)
L6 absorbent line
L7 second circulation line
L8 third circulation line
L9 flue gas discharge line
L10 rich liquid line
L11 reboiler line
L12 first heating medium line
L13 first reflux water line
L14 first carbon dioxide line
L15 reclaimer introduction line
L16 second reflux water line
L17 second heating medium line
L18 reclaimer discharge line
L19 deteriorated material discharge line
L20 third carbon dioxide line
L21 fourth carbon dioxide line
L22 fifth carbon dioxide line
L23 sixth carbon dioxide line
L24 condensed water discharge line
L25 washing water supply line
L26 washing water discharge line
L27 reclaimer line
L28 washing water line
L29 second carbon dioxide line

The invention claimed is:

1. A carbon dioxide recovery apparatus comprising:
a flue gas cooling unit that brings flue gas cooling water into contact with a flue gas to cool the flue gas;
a circulation channel through which the flue gas cooling water that cools the flue gas and condensed water generated by cooling the flue gas are extracted from the flue gas cooling unit and returned to the flue gas cooling unit;
an absorption unit including a carbon dioxide absorbing section that brings the flue gas cooled in the flue gas cooling unit into contact with an absorbent and causes the absorbent to absorb carbon dioxide included in the flue gas, and a flue gas washing section that brings the flue gas including carbon dioxide absorbed in the carbon dioxide absorbing section into contact with flue gas washing water and washes the flue gas;
a regeneration unit that removes carbon dioxide from the absorbent including carbon dioxide absorbed in the absorption unit;

a supply channel through which circulating water circulating through the flue gas cooling unit and the circulation channel is guided as the flue gas washing water to the flue gas washing section and through which an amount of water inside a system is supplied;

a discharge channel through which the circulating water circulating through the flue gas cooling unit and the circulation channel is discharged to outside of the system;

a flue gas washing water circulation channel through which, after the flue gas washing section washes the flue gas, the flue gas washing water is extracted from the flue gas washing section and is returned to the flue gas washing section, the flue gas washing water being the circulating water supplied to the flue gas washing section via the supply channel.

2. The carbon dioxide recovery apparatus according to claim 1, further comprising a cooling tower that cools a cooling medium to cool a distributed fluid, wherein the discharge channel supplies, to the cooling tower, the circulating water discharged through the circulation channel as cooling water that cools the cooling medium.

3. The carbon dioxide recovery apparatus according to claim 1, wherein the supply channel is provided with a capture unit that captures impurities in the circulating water distributed through the supply channel.

4. The carbon dioxide recovery apparatus according to claim 1, further comprising:

a carbon dioxide washing unit that washes, with washing water, carbon dioxide discharged from the regeneration unit; and a washing water channel through which the circulating water distributed through the supply channel is supplied as the washing water to the carbon dioxide washing unit.

5. The carbon dioxide recovery apparatus according to claim 1, further comprising:

a reclaimer that removes impurities of the absorbent; and a reclaimer channel through which the circulating water distributed through the supply channel is supplied to the reclaimer.

6. The carbon dioxide recovery apparatus according to claim 1, wherein the flue gas washing unit washes the flue gas only with the circulating water supplied through the supply channel, and the flue gas washing unit does not comprise a device that moves the flue gas washing water being brought into contact with the flue gas to an upper stream of a flow of the flue gas washing water and circulates the flue gas washing water to be brought into contact with the flue gas again.

7. The carbon dioxide recovery apparatus according to claim 1, further comprising an outer shell that accommodates the flue gas cooling unit and the absorption unit, wherein the absorption unit is provided above the flue gas cooling unit.

* * * * *